(12) United States Patent
Ohira et al.

(10) Patent No.: US 6,617,378 B2
(45) Date of Patent: Sep. 9, 2003

(54) GOLF BALL COATING COMPOSITION

(75) Inventors: Takashi Ohira, Chichibu (JP); Nobuhiko Sato, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/983,752

(22) Filed: Oct. 25, 2001

(65) Prior Publication Data

US 2002/0082358 A1 Jun. 27, 2002

(30) Foreign Application Priority Data

Oct. 30, 2000 (JP) ........................ 2000-330418

(51) Int. Cl.⁷ .................. A63B 37/14; C08K 5/3492
(52) U.S. Cl. .................. 524/100; 524/719; 524/720; 473/378
(58) Field of Search .................. 524/100, 719, 524/720; 473/378

(56) References Cited

U.S. PATENT DOCUMENTS 3,380,955 A * 4/1968 Cross
5,836,833 A * 11/1998 Shimosaka
6,180,714 B1 * 1/2001 Ohira

FOREIGN PATENT DOCUMENTS

| GB | 2274661 | * | 8/1994 |
| JP | 48-37969 | | 11/1973 |
| JP | 2000-167085 | * | 6/2000 |

* cited by examiner

*Primary Examiner*—David J. Buttner
(74) *Attorney, Agent, or Firm*—Sughrue Mion, PLLC

(57) ABSTRACT

A golf ball coating composition is obtained by incorporating in a base resin paint a fluorescent whitening agent which is a 7-triazinylamino-3-phenylcoumarin derivative. A golf ball painted on its cover surface with the coating composition is improved in weather resistance and brightness and minimized in color fading due to diffusion of the whitening agent into the cover.

4 Claims, No Drawings

GOLF BALL COATING COMPOSITION

This invention relates to golf ball coating compositions and golf balls painted therewith. More particularly, it relates to a golf ball coating composition containing a fluorescent whitening agent, which composition is improved in weather resistance and brightness and minimized in color fading due to diffusion into the cover.

BACKGROUND OF THE INVENTION

In the prior art for surface painting of golf balls, attempts have been made such that the ball surface looks whiter in color, by adding titanium dioxide and optionally a fluorescent whitening agent to the cover or white enamel paint, and by incorporating a fluorescent whitening agent in a clear paint coat enclosing the cover.

The mainstream technique used nowadays for highlighting whiteness is to form a cover toned white with titanium dioxide, subjecting the cover to such surface treatment as corona treatment, plasma treatment, UV treatment or electron beam treatment, and applying a clear paint containing a fluorescent whitening agent to the treated surface. This technique is productive and cost effective.

However, as the cover material is made softer in these days, the painting of golf balls encounters new problems. More particularly, cover materials now have the tendency that the glass transition temperature becomes so low that more molecular motion occurs even at low temperatures, and the ionic crosslinking density becomes so low that the polymeric network structure becomes coarser. Then on use of golf ball coating compositions containing conventional fluorescent whitening agents, there arises a problem that the fluorescent whitening agent can diffuse into the soft cover, failing to exert the desired fluorescent whitening effect.

SUMMARY OF THE INVENTION

An object of the invention is to provide a golf ball coating composition containing a fluorescent whitening agent, which composition is improved in weather resistance and brightness and minimized in color fading due to diffusion of the composition, especially fluorescent whitening agent, into the cover. Another object is to provide a golf ball surface painted with the coating composition.

It has been found that using a 7-triazinylamino-3-phenylcoumarin derivative as the fluorescent whitening agent to be formulated in a base resin paint, a golf ball coating composition is obtained which is improved in weather resistance and brightness over coating compositions containing conventional fluorescent whitening agents. In addition, the diffusion of the fluorescent whitening agent in the form of a 7-triazinylamino-3-phenylcoumarin derivative into the cover material is retarded, and color fading is thus minimized. A golf ball surface painted with the coating composition looks prominently white.

The present invention provides a golf ball coating composition comprising a base resin paint and a fluorescent whitening agent wherein a 7-triazinylamino-3-phenylcoumarin derivative of the following general formula (1) is used as the fluorescent whitening agent.

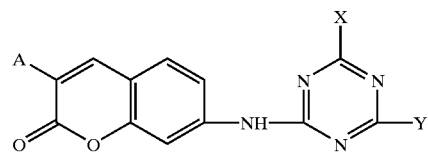

(1)

Herein A is a phenyl group which may have a non-water-soluble group, X is a halogen atom, amino group, primary amine residue or secondary amine residue, and Y is a phenyl group, halogen atom, amino group, primary amine residue or secondary amine residue.

The fluorescent whitening agent is preferably added in an amount of 0.01 to 2 parts by weight per 100 parts by weight of all non-volatiles in the coating composition.

Typically the base resin paint is a two-pack curing type urethane resin paint.

In another aspect, the invention provides a golf ball comprising a core and a cover of at least one layer enclosing said core, the ball being painted on its surface with the coating composition defined above. The cover is preferably made of an ionomer resin or polyester elastomer or a mixture thereof having a Shore D hardness of 35 to 65.

By formulating a fluorescent whitening agent in the form of a 7-triazinylamino-3-phenylcoumarin derivative in base resin paint according to the invention, the invention solves the problem of less fluorescent whitening effect associated with currently widespread soft cover materials that a low glass transition temperature, more molecular motion at low temperatures, a low ionic crosslinking density and a coarse polymeric network structure allow the fluorescent whitening agent to diffuse into the cover to detract from the fluorescent whitening effect. As a result, color fading is inhibited. Additionally, the inventive fluorescent whitening agent is highly soluble in the base resin paint. When a golf ball is surface painted with the coating composition, the golf ball has good weather resistance, high brightness and prominently white appearance and improved quality.

DESCRIPTION OF THE PREFERRED EMBODIMENT

The golf ball coating composition of the invention is defined as comprising a base resin paint and a fluorescent whitening agent. The fluorescent whitening agent is a 7-triazinylamino-3-phenylcoumarin derivative of the following general formula (1).

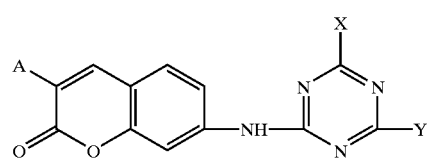

(1)

Herein, A is a phenyl group which may have a non-water-soluble group. Examples of the non-water-soluble group include alkyl groups of 1 to 10 carbon atoms, especially 1 to 4 carbon atoms, such as methyl, ethyl and propyl, and halogen atoms such as fluorine, bromine and chlorine.

X is a halogen atom, amino group, primary amine residue or secondary amine residue. Examples of the primary or secondary amine residue include residues of aliphatic primary amines, aliphatic secondary amines, aromatic primary amines, aromatic secondary amines, aromatic aliphatic primary amines, aromatic aliphatic secondary amines, alicyclic primary amines, alicyclic secondary amines, aliphatic heterocyclic primary amines, aliphatic heterocyclic secondary amines, aromatic heterocyclic primary amines, and aromatic heterocyclic secondary amines.

Illustrative examples of X are halogen atoms such as fluorine, bromine and chlorine, ammonia, methylamine, ethylamine, propylamine, butylamine, dimethylamine, diethylamine, dibutylamine, monoethanolamine, monoisopropanolamine, diethanolamine, N-methylethanolamine, N-benzylethanolamine, cyclohexylamine, N-ethylcyclohexyl-amine, benzylamine, dibenzylamine, N,N-dimethyl(or diethyl)aminoethylamine, N,N-dimethyl(or diethyl)amino-propylamine, aniline, N-methyl(or ethyl)aniline, toluidine, chloroaniline, piperidine, morpholine, 2-aminopyridine and 2-aminobenzthiazole.

Y is a phenyl group, a halogen atom such as fluorine, bromine or chlorine, an amino group, or a primary or secondary amine residue as exemplified above for X.

Illustrative examples of the 7-triazinylamino-3-phenylcoumarin derivative include those of the following formulae, which may be used alone or in admixture of two or more.

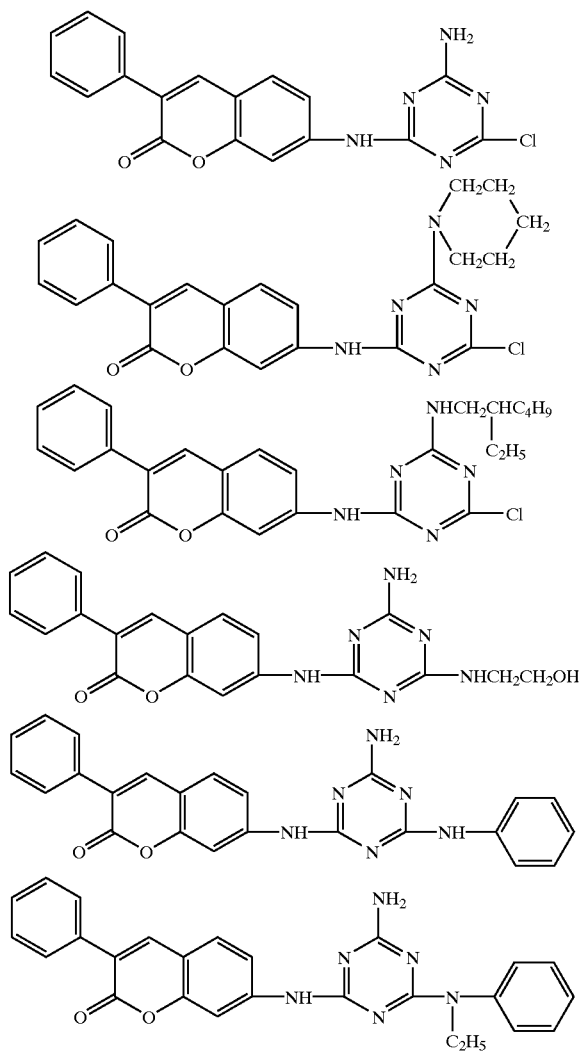

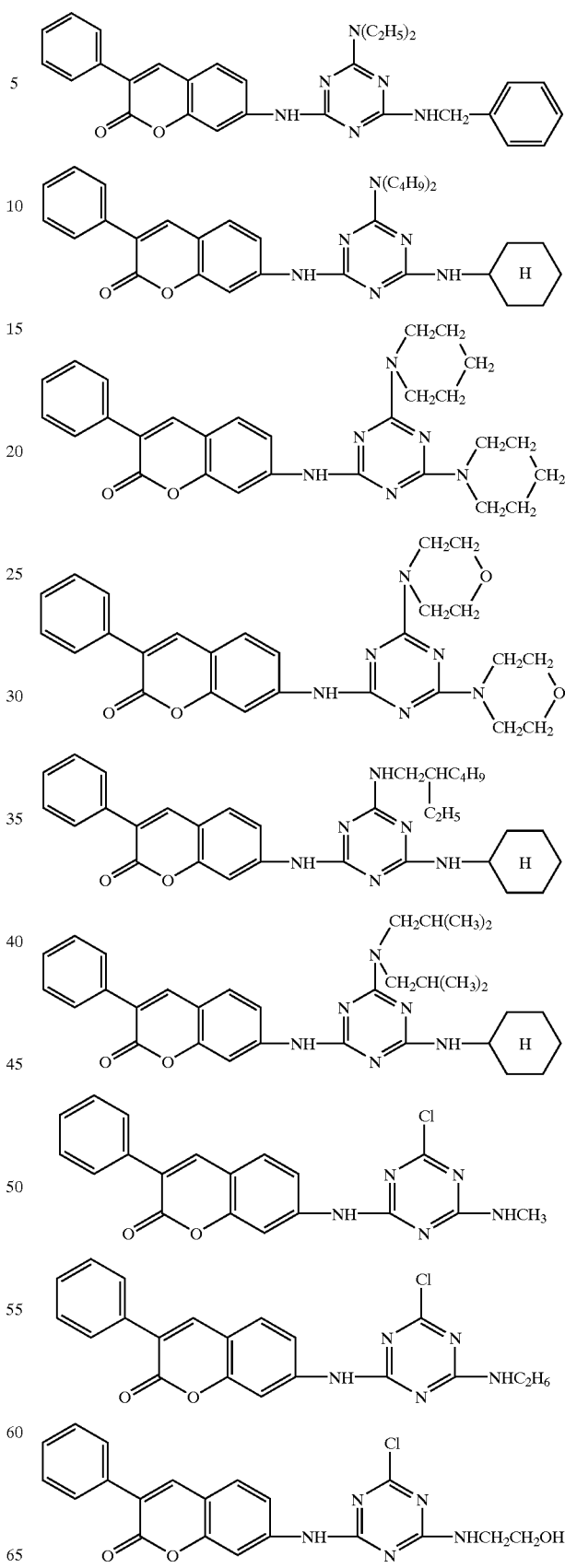

-continued

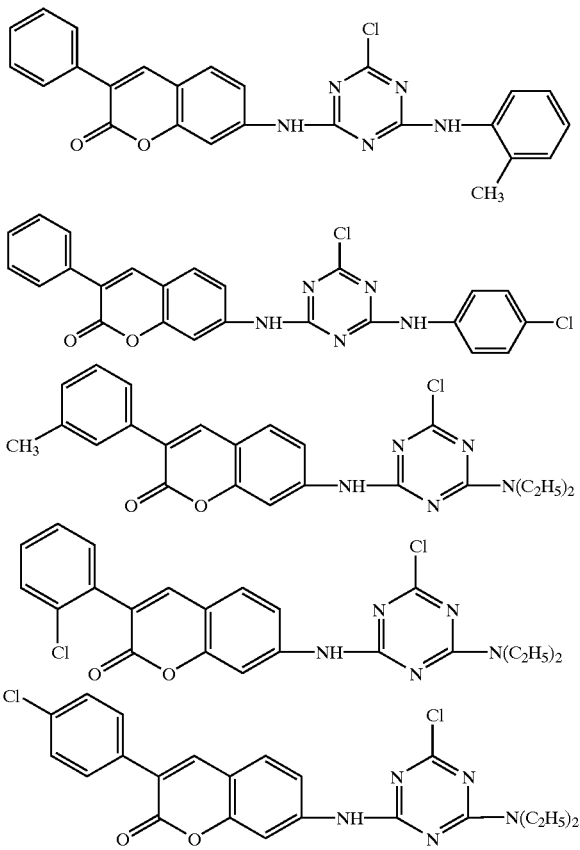

The 7-triazinylamino-3-phenylcoumarin derivatives defined above are used as the fluorescent whitening agent. Such fluorescent whitening agents are commercially available under the trade name of Hakkol PY-1800, Hakkol PYB-D, Hakkol PY-2000 and Hakkol PYZ-D from Hakkol Chemical Co., Ltd.

In the golf ball coating composition of the invention, the fluorescent whitening agent in the form of a 7-triazinylamino-3-phenylcoumarin derivative is preferably added in an amount of 0.01 to 2 parts by weight and more preferably 0.04 to 1 part by weight, per 100 parts by weight of all non-volatiles in the coating composition. Less amounts of the whitening agent may fail to fully exert fluorescent whitening effects. Larger amounts of the whitening agent may allow the coating composition to yellow upon exposure to UV radiation.

The base resin paint for the golf ball coating composition according to the invention is preferably a transparent clear paint which is customarily used for the surface painting of golf balls. Exemplary paints include urethane resin paints, acrylic resin paints, polyester resin paints, polyether resin paints, epoxy resin paints, and modified products thereof, and mixtures thereof. Of these, preferred are two-pack curing type urethane resin paints comprising, in admixture, polyisocyanate and a urethane resin, acrylic resin or polyester resin containing in the resin skeleton functional groups, especially hydroxyl groups, capable of reacting with isocyanate groups.

The polyisocyanate used in the two-pack curing type urethane resin paints is most often hexamethylene diisocyanate of the non-yellowing type. It is acceptable to partially blend tolylene diisocyanate of the yellowing type for the purpose of improving adhesion to the underlying surface. From economical considerations, polyisocyanate of the difficult-to-yellow type may also be used.

In addition to the base resin paint and fluorescent whitening agent, the golf ball coating composition of the invention may contain pigments, dyes, leveling agents, thickeners and the like as long as they do not compromise the objects of the invention.

The golf ball to be painted with the coating composition of the invention is one comprising a core and a cover of at least one layer enclosing the core. The cover may be formed of two, three or more layers. Where the cover is formed of plural layers, at least the cover outermost layer should possess the properties described below. The core is not critical and may be formed from any well-known material by a conventional technique.

The cover should preferably have a Shore D hardness of 35 to 65, more preferably 40 to 60, even more preferably 40 to 55, and most preferably 50 to 55. A cover with too low a Shore D hardness may be less resilient and less resistant to scuffing. A cover with too high a Shore D hardness may adversely affect the feel on hitting and the spin performance. The cover usually has a thickness of about 0.5 to 3 mm.

The cover material may be selected from thermoplastic resins which are commonly used as the golf ball cover stock. For example, ionomer resins, polyester elastomers and mixtures thereof are useful. Of these, ionomer resins are preferred.

The ionomer resins are typically prepared by using ethylene-unsaturated carboxylic acid copolymers as the base and combining them with metal compounds capable of supplying cations. The ethylene-unsaturated carboxylic acid copolymers are copolymers of ethylene with unsaturated carboxylic acids having 3 to 6 carbon atoms, such as acrylic acid, methacrylic acid, maleic acid and fumaric acid, or vinyl benzoate, etc. Examples of suitable metal compounds capable of supplying cations include formates, acetates, nitrates, carbonates, hydrogencarbonates, oxides, hydroxides and alkoxides of alkali metals, alkaline earth metals and transition metals. Exemplary metals are Na, Zn, Li, Mg, Mn, Ca, Co and K.

The cover material mentioned above is commercially available. The ionomer resins are available under the trade name of Himilan 1605, Himilan 1706, Himilan 1707, Himilan AM7315, Himilan AM7311 and Himilan AM7318 from Dupont-Mitsui Polychemical Co., Ltd., Surlyn 7930 and Surlyn 6320 from E. I. DuPont, and Nucrel AN4311. The polyester elastomers are available under the trade name of Hytrel 4047 and Hytrel 4767 from Dupont-Toray Co., Ltd.

The golf ball coating composition of the invention is advantageously used as a clear paint to be applied to the ball surface, that is, the surface of the cover constituting the outermost layer of the ball. Better results are obtained when the coating composition is applied to the ball surface which has been subjected to dry surface treatment such as corona treatment, plasma treatment, UV irradiation treatment or electron beam irradiation treatment. Independent of whether the ball surface has been treated with primer or coated with white enamel, the coating composition can exert satisfactory effects for the following reason. The primer or enamel layer is as thin as several microns to about 50 microns at maximum relative to the cover usually having a thickness of about 2 mm. Then, even if the primer or enamel material allows relatively easy diffusion of the fluorescent whitening agent therein, the underlying cover layer becomes a stopoff to the diffusion of the fluorescent whitening agent, preventing the ball surface from fading. Fluorescent whitening effects are thus accomplished.

The method of applying the coating composition of the invention to the ball surface may be any of customarily used methods for the surface coating of golf balls. For example, brush painting, spray painting and electrostatic painting may be employed. The coat preferably has a thickness of about 5 to 50 μm, and more preferably about 10 to 30 μm.

As long as the golf ball of the invention meets the above-described construction, other constituent components are not critical. The golf ball of the invention is applicable to all types of golf balls including solid golf balls such as two-piece golf balls and multi-piece golf balls having a three or more layer structure, and thread wound golf balls. The golf ball of the invention can be manufactured by conventional techniques using well-known materials. The parameters of the golf ball including weight and diameter are set as appropriate according to the Rules of Golf.

When the coating composition of the invention is applied to a golf ball, the painted golf ball of quality is characterized by weather resistance, brightness, and outstanding whiteness and minimized in color fading due to diffusion to the cover material.

EXAMPLE

Examples of the invention are given below by way of illustration and not by way of limitation.

Examples 1–5 and Comparative Examples 1–9

A solid core having a diameter of 38.5 mm was prepared by milling a rubber composition as formulated below in a roll mill and molding the composition under heat and pressure.

| Rubber composition | Parts by weight |
|---|---|
| Cis-1,4-polybutadiene | 100 |
| Zinc diacrylate | 24 |
| Zinc oxide | 19 |
| Antioxidant | 1 |
| Dicumyl peroxide | 1 |

Around the core, cover compositions formulated in Table 1 were injection molded to form covers as shown in Tables 2 and 3. In this way, golf balls having a diameter of 42.8 mm were obtained in Examples 1–5 and Comparative Examples 1–9.

On the cover surface of the golf balls, coating compositions were spray painted to form a paint coat. The formulation of the coating compositions is shown in Tables 2 and 3 together with the type of fluorescent whitening agent used therein.

The painted golf balls of Examples 1–5 and Comparative Examples 1–9 were evaluated for outer appearance (whiteness and light emission upon UV exposure) before and after a weathering test. The results are shown in Tables 2 and 3.

Outer Appearance in Terms of Whiteness

By visual observation, the whiteness of the painted ball surface was evaluated according to the following criterion.

○: white

Δ: less white

X: yellow

Also, the painted ball surface was measured for Lab color space (L, a, b) according to JIS Z8701, using a differential calorimeter Model MSC-IS-2DH (Suga Tester K.K.). In the Lab color space, L stands for a lightness that represents whether a perceived color is light or dark, that is, a degree of brightness. Larger values of L indicate brighter color. Letters a and b represent color in red-green direction and yellow-blue direction, respectively. Larger values of a indicate more reddish color whereas smaller values of a indicate more greenish color. Larger values of b indicate more yellowish color whereas smaller values of b indicate more bluish color.

Outer Appearance in Terms of Light Emission

By visual observation, the degree of light emitted upon exposure to black light was evaluated according to the following criterion.

○: vivid light emission

Δ: less vivid light emission

X: dead light emission

Outer Appearance After Weathering Test

The painted ball was exposed to a mercury lamp for 24 hours. A change of color of the paint coat after the lamp exposure was determined using the differential colorimeter Model MSC-IS-2DH (Suga Tester K.K.). A color difference ΔE of the paint coat before and after the lamp exposure was calculated, based on the Lab color space according to JIS Z8701. A smaller color difference ΔE indicates a less discoloration of the paint coat.

TABLE 1

| Component | Cover type | | |
|---|---|---|---|
| (pbw) | A | B | C |
| Himilan 1605 | 50 | — | — |
| Himilan 1706 | 50 | — | — |
| Surlyn 7930 | — | 40 | — |
| Surlyn 6320 | — | 40 | — |
| Nucrel AN4311 | — | 20 | — |
| Hytrel 4047 | — | — | 100 |
| Shore D hardness | 63 | 52 | 40 |

Note:
Himilan 1605: ionomer resin by Dupont-Mitsui Polychemical Co., Ltd.
Himilan 1706: ionomer resin by Dupont-Mitsui Polychemical Co., Ltd.
Surlyn 7930: ionomer resin by Dupont
Surlyn 6320: ionomer resin by Dupont
Nucrel AN4311: ethylene-methacrylic acid-acrylate terpolymer by Dupont-Mitsui Polychemical Co., Ltd.
Hytrel 4047: polyester elastomer by Dupont-Toray Co., Ltd.

TABLE 2

| Component | Example | | | | |
|---|---|---|---|---|---|
| (pbw) | 1 | 2 | 3 | 4 | 5 |
| Base resin | 100 | 100 | 100 | 100 | 100 |
| Fluorescent whitening agent A | 0.1 | 0.1 | 0.1 | 0.05 | 0.8 |
| Cover type | A | B | C | B | B |
| Outer appearance (whiteness) | ○ | ○ | Δ | ○ | ○ |
| After painting   L value | 95.3 | 95.2 | 95.2 | 95.2 | 95.8 |
| a value | 0.1 | 0.1 | −0.2 | −0.1 | 0.3 |
| b value | −5.9 | −5.8 | −5.3 | −5.5 | −9.8 |
| Light emission upon UV exposure | ○ | ○ | Δ | ○ | ○ |
| ΔE after mercury lamp exposure | 1.55 | 1.33 | 1.29 | 1.3 | 1.88 |

Note:
The base resin is a two-pack curing type urethane resin.

Fluorescent whitening agent A is Hakkol PY-1800 by Hakkol Chemical Co., Ltd., which is 7-{[4-chloro-6-(diethylamino)-s-triazin-2-yl]amino}-7-triazinylamino-3-phenyl-coumarin.

TABLE 3

| Component (pbw) | Comparative Example | | | | | | | | |
|---|---|---|---|---|---|---|---|---|---|
| | 1 | 2 | 3 | 4 | 5 | 6 | 7 | 8 | 9 |
| Base resin | 100 | 100 | 100 | 100 | 100 | 100 | 100 | 100 | 100 |
| Fluorescent whitening agent B | 0.07 | 0.07 | 0.07 | | | | | | |
| Fluorescent whitening agent C | | | | 0.07 | 0.07 | 0.07 | | | |
| Fluorescent whitening agent D | | | | | | | 0.1 | 0.1 | 0.1 |
| Cover type | A | B | C | A | B | C | A | B | C |
| Outer appearance (whiteness) | x | x | x | Δ | x | x | ○ | Δ | x |
| After painting L value | 95.3 | 95.1 | 95.1 | 95.3 | 95.1 | 94.9 | 93.8 | 93.5 | 93.5 |
| a value | −0.9 | −0.8 | −0.7 | −0.4 | −0.5 | −0.7 | 0.7 | 0.1 | −0.6 |
| b value | −4.3 | −4.1 | −4.0 | −5.3 | −4.6 | −4.0 | −7.4 | −5.2 | −4.3 |
| Light emission upon UV exposure | x | x | x | Δ | x | x | ○ | Δ | x |
| ΔE after mercury lamp exposure | 2.16 | 2.08 | 1.89 | 2.24 | 2.12 | 1.89 | 3.61 | 2.85 | 2.03 |
| Remarks | | less soluble in paint | | | | | | | |

Note:
The base resin is a two-pack curing type urethane resin.

Fluorescent whitening agent B is Hostalux KS-N by Hoechst, which is the methylated product of 4,4'-bis(2-benzoxazolyl)stilbene which is mainly composed of 4-(2-benzoxazolyl)-4'-(5-methyl-2-benzoxazolyl)stilbene and contains 4,4'-bis(5-methyl-2-benzoxazolyl)stilbene and 4,4'-bis(2-benzoxazolyl)stilbene as isomers.

Fluorescent whitening agent C is Hostalux KS by Hoechst, which is the methylated product of 4,4'-bis(2-benzoxazolyl)stilbene which is mainly composed of 4-(2-benzoxazolyl)-4'-(5-methyl-2-benzoxazolyl)stilbene and contains 4,4'-bis(5-methyl-2-benzoxazolyl)stilbene and 4,4'-bis(2-benzoxazolyl)stilbene as isomers.

Fluorescent whitening agent D is Uvitex OB by Ciba Geigy, which is 2,5-bis(2-benzoxazolyl)thiophene.

As is evident from Tables 2 and 3, golf balls surface painted with coating compositions containing a fluorescent whitening agent in the form of a 7-triazinylamino-3-phenylcoumarin derivative in Examples 1–5 experience a less reduction of brightness and are improved in weather resistance, as compared with golf balls surface painted with coating compositions containing conventional fluorescent whitening agents in Comparative Examples 1–9.

Japanese Patent Application No. 2000-330418 is incorporated herein by reference.

Reasonable modifications and variations are possible from the foregoing disclosure without departing from either the spirit or scope of the present invention as defined by the claims.

What is claimed is:

1. A golf ball comprising a core and a cover of at least one layer enclosing said core, the ball being painted on its surface with the coating composition comprising a base resin paint and a fluorescent whitening agent, said fluorescent whitening agent being a 7-triazinylamino-3-phenylcoumarin derivative of the following general formula (1):

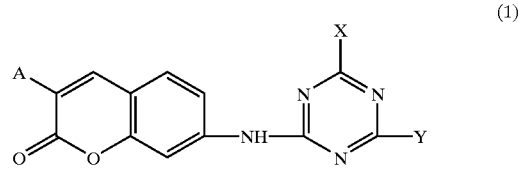

(1)

wherein A is a phenyl group which may have a non-water-soluble group, X is a halogen atom, amino group, primary amine residue or secondary amine residue, and Y is a phenyl group, halogen atom, amino group, primary amine residue or secondary amine residue, and the added amount of said fluorescent whitening agent being from 0.01 to 2 parts by weight per 100 parts by weight of all non-volatiles in the coating composition, and said cover having a Shore D hardness of 40 to 55.

2. The golf ball of claim 1 wherein the cover is made of an ionomer resin or polyester elastomer or a mixture thereof.

3. The golf ball of claim 1, wherein said added amount of said fluorescent whitening agent is from 0.04 to 1 parts by weight per 100 parts by weight of all non-volatiles in the coating composition.

4. The golf ball of claim 1, wherein said cover has a Shore D hardness of 50 to 55.

* * * * *